Oct. 8, 1929.  F. A. SQUIRES  1,730,790

MAP HOLDER

Filed June 7, 1928

Inventor

*F. A. Squires*

By *Hiram A. Sturges*

Attorney

Patented Oct. 8, 1929.

1,730,790

UNITED STATES PATENT OFFICE

FRED A. SQUIRES, OF OMAHA, NEBRASKA

MAP HOLDER

Application filed June 7, 1928. Serial No. 283,641.

This invention relates to a map holder for the steering posts of motor vehicles and particularly for automobiles, and has for its objects, broadly, to provide a holder which will be convenient in use, will be durable, and will consist of few and simple parts so that it may be manufactured at a limited expense.

One of the specific objects is to provide a metallic casing of such construction that it may contain a plurality of road maps, will support a map for convenient inspection and will permit the maps to be interchanged, these features being important for use of salesmen and tourists who travel extensively and require several maps.

Another object is to provide a map holder adapted to be mounted upon the steering post of an automobile, which may be adjusted transversely and at right-angles to said post, so that it may be applied to the steering posts, generally, of various types of automobiles. Another object is to provide means for adjusting the map holder and maintaining it at a selected angle in the vertical plane of the steering post.

With the foregoing objects in view and others to be mentioned the invention presents a new and useful construction, combination and arrangement of parts as described herein and claimed and as shown in the accompanying drawing, it being understood that changes may be made in form, size, proportion and minor details as may be found of advantage, said changes being determined by the scope of the invention as claimed.

Figure 1:
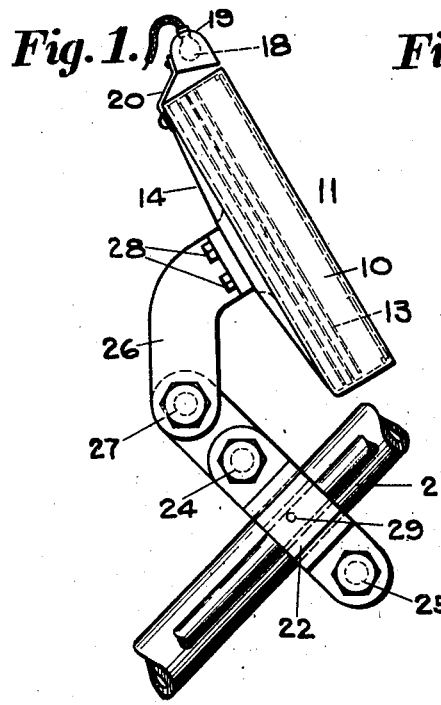
Figure 2:
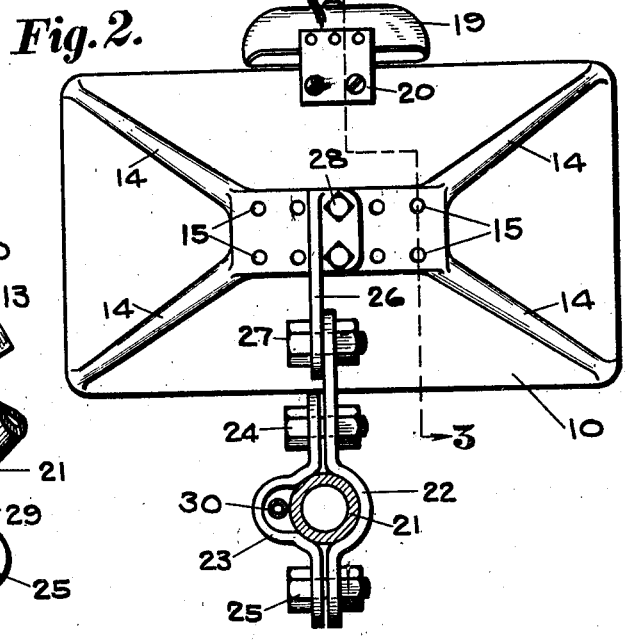
Figure 3:
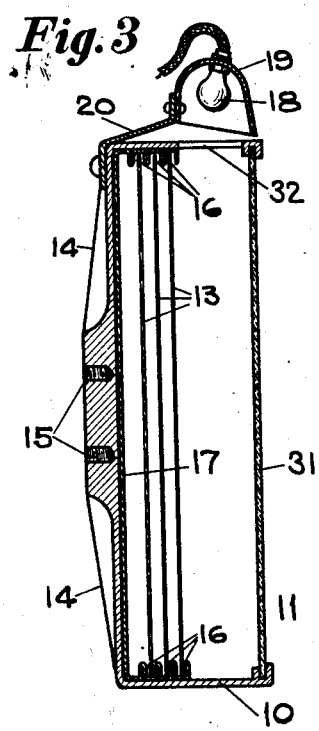
Figure 4:
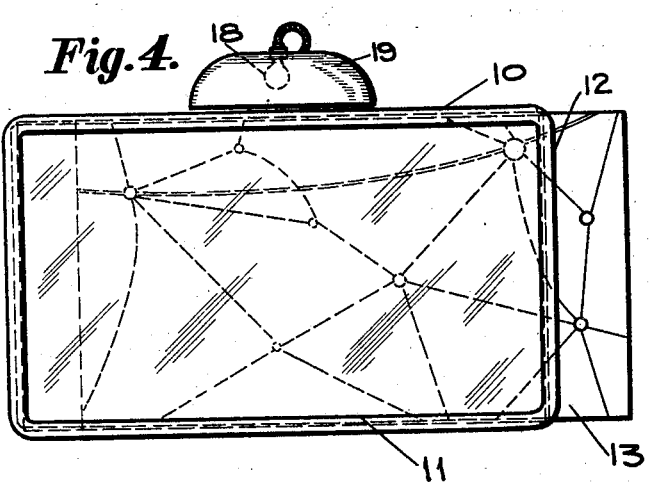

In the drawings Fig. 1 is an end view of the map holder and a part of a steering post. Fig. 2 is a rear view of the map holder and its fastening means. Fig. 3 is a transverse section on line 3—3 of Fig. 2. Fig. 4 is a front view of the metallic casing for holding the maps, one of the maps being shown partly withdrawn from the casing.

Referring now to the drawing for a more particular description, the map holder consists, in part, of a metallic, elongated, rectangular casing 10, its front wall being provided with a sight-aperture 11, one of its ends, indicated at 12 being open to permit road-maps 13 to be inserted therein.

The casing is preferably constructed of attenuated sheet metal, and its rear wall is reinforced by forming ridges 14 in its rear wall. Numeral 15 indicates adjusting-apertures formed in the rear wall of the casing to provide for certain adjustments later to be described.

In order that a suitable number of road-maps, in folded condition, may be carried, ready for convenient use in the casing, the top and bottom of said casing is provided with grooves 16 for receiving said maps.

The grooves mentioned are preferably provided by use of a metallic sheet 17 bent upon itself at and near two of its opposed edges to form the channels or grooves 16, and it will be understood that road-maps may be inserted in the casing, each map, being disposed in two opposed channels or grooves 16, and in operation the particular map to be used or inspected is placed in the pair of grooves nearest to the sight-aperture 11, this arrangement of a plurality of maps being a matter of great convenience for tourists or salesmen who travel extensively in automobiles.

In order that a road-map may be inspected during night travel an incandescent lamp 18 is provided, its socket being mounted in a hood 19 carried by a bracket 20 which is suitably riveted to the casing, whereby the map in the casing may be adequately illuminated.

The casing thus described may be mounted upon the steering post 21 by any suitable means which will provide certain adjustments. The preferred support for the casing consists, in part, of a pair of clamping-bands 22 and 23 having curved parts for engaging the steering post at the opposed sides thereof, suitable threaded keepers 24 and 25 being provided for pressing said clamping-members toward each other upon the steering post.

Numeral 26 indicates an adjusting-bar or hinge-member which is pivoted to the upper end of the clamping-member as indicated at 27. Numerals 28 indicate a pair of keepers adapted to be mounted in any selected pair of apertures 15 of the casing 10, these apertures being arranged in pairs at longitudinal intervals of the casing. The upper end of the hinge member 26 is provided with a flange which is traversed by said keepers.

It will therefore be seen that by use of the keepers 28, the casing may be adjusted transversely of and approximately at right-angles to the steering post, this being of advantage since the steering posts of some automobiles are located closely adjacent to one of their sides, and in such instances the casing may be shifted toward the middle of the automobile, and as is obvious, this adjustment transversely of the automobile is a necessary feature, so that the map holder may be mounted upon the steering posts of the various types of automobiles.

Also, since drivers of automobiles differ in size or stature, means should be provided for changing the inclination of the casing so that the map may be inspected to advantage, and this adjustment may be made by use of the bolt 27 which controls the hinge-bar 26.

Numeral 29 indicates an electrical contact-pin, this being useful and necessary for completing an electrical circuit since the shellac or varnish on the steering post often operates as a complete insulation. The contact-pin is preferably formed as a screw with a needle-point and insures a metallic contact with the steering post.

It will be noted that the clamping-member 23 is of irregular form, its enlarged part or outward curvature being for the purpose of receiving a control rod 30 which is disposed parallel with and adjacent to the steering post.

Numeral 31 indicates a transparent plate best shown in Fig. 3 of the drawing, said plate operating as a cover for protecting the maps from dust or injury. As best shown in said Fig. 3 the top of the casing is provided with an opening 32, this opening being located rearwardly of the transparent plate 31, and therefore the rays of light from the lamp will be directed to the maps to advantage, the edge of the hood 19 terminating at the top of the casing and operating to protect the sight of the driver from the dazzling effects of the lamp.

I claim as my invention:—

1. In a map holder for the steering post of a motor vehicle, an elongated rectangular casing open at one of its ends for receiving a map and having a sight-aperture in its front wall, a clamping device for mounting on the steering post, an adjusting-bar adapted to be secured to the casing at selected longitudinal intervals of said casing, and means for securing the adjusting-bar to said clamping device.

2. In a map holder for the steering post of a motor vehicle, an elongated, metallic rectangular casing open at one of its ends and having a sight-aperture in its front wall and adjusting-apertures disposed at longitudinal intervals in its rear wall and having grooves opening inwardly from its top and bottom for receiving the maps, a clamping-device adapted to be mounted on the steering-post, an adjusting-bar, keepers in the adjusting-apertures of the casing at selected longitudinal intervals of said casing and engaging the adjusting-bar, and means for securing the adjusting-bar to said clamping device.

3. In a map holder for the steering post of a motor vehicle, a rectangular metallic casing open at one of its ends and having grooves opening inwardly from its top and bottom for receiving maps, and having a sight-aperture in its front to permit visual inspection of the maps, and provided with an opening in its top, an incandescent lamp, a hood for supporting the lamp and disposed in the plane of the last named opening for directing rays of light through said opening, a clamping device on the steering post, and co-operating fastening devices for connecting the casing with said clamping device.

In testimony whereof, I have affixed my signature.

FRED A. SQUIRES.